United States Patent
Shi et al.

(10) Patent No.: US 11,336,094 B2
(45) Date of Patent: May 17, 2022

(54) INVERTER, POWER GENERATING SYSTEM, AND METHOD FOR SUPPRESSING HARMONIC DISTORTION OF ALTERNATING CURRENT SYSTEM

(71) Applicant: HUAWEI TECHNOLOGIES CO., LTD., Guangdong (CN)

(72) Inventors: Rongliang Shi, Shenzhen (CN); Zhangping Shao, Shanghai (CN); Kai Xin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 35 days.

(21) Appl. No.: 17/081,076

(22) Filed: Oct. 27, 2020

(65) Prior Publication Data

US 2021/0044110 A1 Feb. 11, 2021

Related U.S. Application Data

(63) Continuation of application No. PCT/CN2019/084623, filed on Apr. 26, 2019.

(30) Foreign Application Priority Data

Apr. 28, 2018 (CN) .......................... 201810401979.1

(51) Int. Cl.
*H02J 3/01* (2006.01)
*H02J 3/38* (2006.01)
(Continued)

(52) U.S. Cl.
CPC ................ *H02J 3/01* (2013.01); *H02J 3/381* (2013.01); *H02M 1/126* (2013.01); *H02M 1/44* (2013.01); *H02M 7/539* (2013.01); *H02J 2300/24* (2020.01)

(58) Field of Classification Search
CPC .......... H02J 3/01; H02J 3/381; H02J 2300/24; H02J 3/38; H02M 1/126; H02M 1/44; H02M 7/539; H02M 1/12
See application file for complete search history.

(56) References Cited

FOREIGN PATENT DOCUMENTS

| CN | 101494385 A | 7/2009 |
| CN | 202014096 U | 10/2011 |

(Continued)

OTHER PUBLICATIONS

Xu Dezhi et al. Modeling and Analysis of Harmonic Interaction Between Multiple Grid-connected Inverters and the Utility Grid, Proceedings of the CSEE, vol. 33 No. 12 Apr. 25, 2013. pp. 64-72. with English abstract.

(Continued)

*Primary Examiner* — Robert L Deberadinis
(74) *Attorney, Agent, or Firm* — Womble Bond Dickinson (US) LLP

(57) ABSTRACT

An inverter includes an inverter circuit; an alternating current filter, where an input port of the alternating current filter is connected to an output port of the inverter circuit; an alternating current electromagnetic interference (EMI) filter; and a first alternating current switch, connected between an output port of the alternating current filter and an input port of the alternating current EMI filter. The first split capacitor is disposed between the first alternating current switch and the input port of the alternating current EMI filter; and when the first alternating current switch is turned off, the first split capacitor is disconnected from the output port of the alternating current filter, and the first split capacitor is connected to a circuit in which an alternating current system connected to the output port of the alternating current EMI filter is located, to suppress harmonic distortion of the alternating current system.

13 Claims, 10 Drawing Sheets

(51) Int. Cl.
*H02M 1/12* (2006.01)
*H02M 1/44* (2007.01)
*H02M 7/539* (2006.01)

(56) References Cited

FOREIGN PATENT DOCUMENTS

| | | | |
|---|---|---|---|
| CN | 102263417 | A | 11/2011 |
| CN | 102522879 | A | 6/2012 |
| CN | 102904286 | A | 1/2013 |
| CN | 103138544 | A | 6/2013 |
| CN | 103595063 | A | 2/2014 |
| CN | 102969877 | B | 12/2014 |
| CN | 104836469 | A | 8/2015 |
| CN | 104901568 | A | 9/2015 |
| EP | 1276219 | A1 | 1/2003 |

OTHER PUBLICATIONS

Liu Huaiyuan et al. Analysis, Detection and Mitigation of Resonance in Grid-connected Converter Systems, Proceedings of the CSEE, vol. 36 No. 4, Feb. 20, 2016, pp. 1061-1074. with English abstract.

Liu Hong et al. A Strategy to Suppress Resonance of Distribution Network-Connected Inverters Based on Voltage Control at Point of Common Coupling, Power System Technology, vol. 39 No. 2, Feb. 2015. pp. 334-340.

Zhang Xing et al. Modeling and Resonance Analysis of Multi-paralleled Grid-tied Inverters in PV Systems, Proceedings of the CSEE, vol. 34 No. 3, Jan. 25, 2014, pp. 336-345. with English abstract.

Rafael Pe na-Alzola et al., Analysis of the Passive Damping Losses in LCL-Filter-Based Grid Converters, IEEE Trans. Power Electron., vol. 28, No. 6, pp. 2642 2646, Jun. 2013.

INVERTER, POWER GENERATING SYSTEM, AND METHOD FOR SUPPRESSING HARMONIC DISTORTION OF ALTERNATING CURRENT SYSTEM

CROSS-REFERENCE TO RELATED APPLICATIONS

This application is a continuation of International Application No. PCT/CN2019/084623, filed on Apr. 26, 2019, which claims priority to Chinese Patent Application No. 201810401979.1, filed on Apr. 28, 2018. The disclosures of the aforementioned applications are hereby incorporated by reference in their entireties.

TECHNICAL FIELD

This application relates to the field of power technologies, and more specifically, to an inverter, a power generating system, and a method for suppressing harmonic distortion of an alternating current system.

BACKGROUND

An inverter is generally connected between a direct current (DC) system and a power grid, and is an apparatus for converting a direct current into an alternating current (AC). The inverter mainly includes an inverter circuit, an alternating current filter, an alternating current switch, and an alternating current electromagnetic interference (EMI) filter. The inverter circuit is configured to convert the direct current into the alternating current. The alternating current filter and the alternating current EMI filter are configured to perform filtering processing on the alternating current generated by the inverter circuit, and output an alternating current obtained after filtering processing to the power grid.

An alternating current EMI filter with a typical structure usually has a differential-mode filter capacitor and a common-mode filter capacitor, so that the alternating current EMI filter has a capacitive impedance characteristic. Therefore, when the inverter is off-grid (the alternating current switch is turned off), the alternating current EMI filter is directly connected to the power grid, to connect capacitors connected in parallel to the power grid. The capacitors connected in parallel and an inductor of the power grid constitute a resonance circuit to generate a resonance. When the resonance circuit overlaps with a frequency band of a harmonic voltage in the power grid, the harmonic voltage is excessively amplified, and voltage distortion caused by the resonance further deteriorates control stability of the inverter, thereby affecting performance of the inverter.

To weaken or suppress a system resonance, in a conventional solution, the resonance (or referred to as harmonic distortion) caused by the inverter is usually suppressed by adding an electrical component. However, a manner of adding the component not only increases hardware costs, but also affects reliability of an entire system, and has a poor actual application effect.

SUMMARY

This application provides an inverter, a power generating system, and a method for suppressing harmonic distortion of an alternating current system, to suppress harmonic distortion input into the alternating current system.

According to a first aspect, an inverter is provided, where the inverter specifically includes: an inverter circuit, an alternating current filter, an alternating current EMI filter, and a first alternating current switch.

An output port of the inverter circuit is connected to an input port of the alternating current filter, and the first alternating current switch is connected between an output port of the alternating current filter and an input port of the alternating current EMI filter.

The inverter further includes a first split capacitor, and the first split capacitor is disposed between the first alternating current switch and the input port of the alternating current EMI filter. When the first alternating current switch is turned off, the first split capacitor is disconnected from the output port of the alternating current filter, and the first split capacitor is connected to a circuit in which an alternating current system connected to the output port of the alternating current EMI filter is located, to suppress harmonic distortion input into the alternating current system.

It should be understood that, the inverter may convert a direct current into an alternating current by using the inverter circuit, perform, by using the alternating current filter and the alternating current EMI filter, filtering processing on the alternating current from conversion by using the inverter circuit, and transmit an alternating current obtained after filtering processing to the alternating current system. The alternating current system may be used for power supply after obtaining the alternating current.

In an embodiment, when the first alternating current switch is turned on, the first split capacitor is connected to the output port of the alternating current filter, and the first split capacitor constitutes a filter capacitor of the alternating current filter.

It should be understood that the first split capacitor is a capacitor of the alternating current filter, but the capacitor is disposed outside the alternating current filter. When the first alternating current switch is turned on, the first split capacitor constitutes the filter capacitor of the alternating current filter.

In an embodiment, the first split capacitor is all capacitors or some capacitors of the alternating current filter.

When the first split capacitor is the some capacitors of the alternating current filter, in addition to the first split capacitor, the alternating current filter may further include another capacitor, and the another capacitor may be located between the input port and the output port of the alternating current filter.

In an embodiment, the first split capacitor may be a single-phase capacitor or may be a three-phase capacitor.

When the first split capacitor is the single-phase capacitor, the first alternating current switch is a single-phase alternating current switch. When the first split capacitor is the three-phase capacitor, the first alternating current switch is a three-phase alternating current switch, and the first split capacitor is constituted by three-phase branch capacitors. Specifically, when the first split capacitor is the three-phase capacitor, the first split capacitor may be constituted by a first branch capacitor, a second branch capacitor, and a third branch capacitor.

In an embodiment, when the first alternating current switch is turned off, the first split capacitor is connected to the circuit in which the alternating current system is located, and can change, for example, increase a capacitance value of the circuit in which the alternating current system is located, so that the harmonic distortion of the alternating current system can be suppressed.

Further, in an embodiment, the harmonic distortion of the alternating current system can be suppressed by disposing an original capacitor and an original switch of the alternating current filter, and no additional component is added. Therefore, no additional hardware costs or power consumption is caused.

It should be understood that when the first split capacitor is connected to the circuit in which the alternating current system is located, a resonance frequency of a resonant branch of the alternating current system can be changed, thereby staggering a frequency band in which a harmonic voltage of the alternating current system is located, and suppressing the harmonic distortion of the alternating current system. Specifically, the resonance frequency of the resonant branch of the alternating current system is related to a capacitor and an inductor that are included in the resonant branch. After the first split capacitor is connected to the alternating current system, a capacitance value of the resonant branch connected to the alternating current system is changed, so that a resonance frequency of a resonant branch of a power grid is also changed.

In an embodiment, the output port of the alternating current filter is connected to the input port of the alternating current EMI filter by using the first alternating current switch, the first split capacitor is connected in parallel to the input port of the alternating current EMI filter, and the first split capacitor is connected in parallel to the output port of the alternating current filter by using the first alternating current switch.

It should be understood that, because the first alternating current switch is disposed between the alternating current filter and the alternating current EMI filter, when the first alternating current switch is turned off, the output port of the alternating current filter is disconnected from the input port of the alternating current EMI filter; or when the first alternating current switch is turned on, the output port of the alternating current filter is connected to the input port of the alternating current EMI filter.

In an embodiment, the alternating current filter includes an inductor L connected in series between the input port and the output port of the alternating current filter and includes a second split capacitor, and the second split capacitor is connected in parallel between the input port and the output port of the alternating current filter and disposed between the inductor L and the output port of the alternating current filter; and when the first alternating current switch is turned off, the second split capacitor constitutes the filter capacitor of the alternating current filter, to change the capacitance value of the circuit in which the alternating current system is located; or when the first alternating current switch is turned on, the first split capacitor and the second split capacitor are connected in parallel and then connected in series to the inductor L, to jointly constitute the filter capacitor of the alternating current filter. The filter capacitor of the alternating current filter is configured to filter an alternating current obtained through inversion by the inverter circuit.

The first alternating current switch is turned on or turned off to flexibly control whether the some filter capacitors of the alternating current filter are connected to the alternating current system or constitute the filter capacitor of the alternating current filter, and to flexibly control that the some capacitors of the alternating current filter are connected to the alternating current system when the harmonic distortion needs to be suppressed.

Specifically, when the first alternating current switch is turned off and a second alternating current switch is turned on, the first split capacitor is connected to the circuit in which the alternating current system is located, so that the capacitance value of the resonant branch of the alternating current system can be changed, and the resonant frequency of the resonant branch of the alternating current system can be changed, thereby suppressing the harmonic distortion of the alternating current system.

In an embodiment, the inverter further includes the second alternating current switch, the second alternating current switch is disposed between the first alternating current switch and the input port of the alternating current EMI filter, and the first split capacitor is disposed between the first alternating current switch and the second alternating current switch; and when the first alternating current switch is turned off and the second alternating current switch is turned on, the first split capacitor is disconnected from the output port of the alternating current filter, and the first split capacitor is connected to a circuit in which an alternating current system connected to the output port of the inverter is located, to suppress harmonic distortion input into the alternating current system; or when the first alternating current switch is turned on and the second alternating current switch is turned off, the first split capacitor and the second split capacitor are connected in parallel and then connected in series to the inductor L of the filter, to jointly constitute the filter capacitor of the alternating current filter.

Constitution of the filter capacitor of the alternating current filter can be more conveniently adjusted by using the two alternating current switches.

In an embodiment, the output port of the alternating current filter is connected to the input port of the alternating current EMI filter by using the first alternating current switch and the second alternating current switch, the first split capacitor is connected in parallel to the output port of the alternating current filter by using the first alternating current switch, and the first split capacitor is connected in parallel to the input port of the alternating current EMI filter by using the second alternating current switch.

It should be understood that the first split capacitor and the second split capacitor each may be a single capacitor, or may be constituted by connecting a plurality of capacitors in parallel.

With reference to the first aspect or any one of the first implementation to the third implementation of the first aspect, in a fifth implementation of the first aspect, a capacitance value of the first split capacitor is K times a capacitance value of the filter capacitor of the alternating current filter, where K is a value that enables the harmonic distortion of the alternating current system to be less than preset harmonic distortion.

It should be understood that the filter capacitor of the alternating current filter may be a total capacitor of the alternating current filter, and the capacitance value of the filter capacitor may be a total capacitance value of the alternating current filter.

In an embodiment, the value of K is determined based on an equivalent capacitor of the alternating current EMI filter, an equivalent inductor of the alternating current system, and an alternating current system harmonic.

Specifically, the value of K may be determined based on at least one of the equivalent capacitor of the alternating current EMI filter, the equivalent inductor of the alternating current system, and the alternating current system harmonic of the alternating current system, so that the value of K can meet that the harmonic distortion of the alternating current system is less than the preset harmonic distortion.

In an embodiment, the value of K is obtained based on a simulation test or an actual test.

Specifically, the harmonic distortion of the alternating current system may be obtained based on the simulation test or the actual test, and the value of K is adjusted to enable the harmonic distortion of the alternating current system to be less than the preset harmonic distortion. In this case, the obtained value of K is a value that meets a requirement.

According to a second aspect, a photovoltaic power generating system is provided, where the system includes a photovoltaic module, an alternating current system, and the inverter according to any one of the implementations of the first aspect, an output port of the photovoltaic module is connected to an input port of the inverter, an output port of the inverter is configured to connect to an input port of the alternating current system, the photovoltaic module is configured to generate a direct current, the inverter is configured to perform inversion processing on the direct current and input an alternating current obtained through inversion processing into the alternating current system, and the alternating current system is configured to provide the alternating current.

The photovoltaic power generating system is constituted by the inverter according to any one of the implementations of the first aspect, and a first split capacitor can be connected, by controlling an alternating current switch in the inverter, to a circuit in which the alternating current system is located, so as to change a capacitance value of the circuit in which the alternating current system is located, to suppress harmonic distortion of the alternating current system.

The photovoltaic module may also be referred to as a photovoltaic array or a solar panel. The photovoltaic module is a device that directly converts solar energy into electric energy by using a photovoltaic (photovoltaic) effect produced by a semiconductor material in a light condition.

In an embodiment, the photovoltaic power generating system further includes a rectifier. The rectifier is connected between the output port of the photovoltaic module and the input port of the inverter. The rectifier is configured to rectify the direct current generated by the photovoltaic module, and input a direct current obtained after rectification into the inverter.

According to a third aspect, a grid-tied power generating system is provided, where the system includes an alternating current system, N inverters according to the third implementation of the first aspect, and N direct current systems, output ports of the N direct current systems are connected to input ports of the N inverters in a one-to-one manner, and N is an integer greater than or equal to 1, and output ports of the N inverters are connected to an input port of an alternating current system In an embodiment, a first split capacitor can be connected, by controlling an alternating current switch in the inverter, to a circuit in which the alternating current system is located, so as to change a capacitance value of the circuit in which the alternating current system is located, to suppress harmonic distortion of the alternating current system.

According to a fourth aspect, a method for suppressing harmonic distortion of an alternating current system is provided, where the method is applied to the grid-tied power generating system according to the third aspect, and when both a first alternating current switch and a second alternating current switch in any of the N inverters are turned off, the method includes: operation 1: obtaining current total harmonic distortion THD of an alternating current system voltage of the alternating current system; and operation 2: when the current THD is greater than a preset threshold, controlling a second alternating current switch of at least one of the N inverters to be turned on, to enable the current THD to be less than the preset threshold.

In the alternating current system in this application, in the grid-tied power generating system constituted by the N inverters, first split capacitors of some inverters can be connected to the alternating current system by controlling an alternating current switch of the inverter in the grid-tied power generating system to be turned on, so that the harmonic distortion of the alternating current system voltage of the alternating current system can be suppressed.

Specifically, when the alternating current system in the grid-tied power generating system includes a voltage harmonic, the first split capacitor can be connected in parallel to the alternating current system by controlling the alternating current switch to be turned off or turned on. A resonance frequency of a resonant branch of a system can be dynamically changed, thereby staggering a frequency band in which a system harmonic voltage of the alternating current system is located, and avoiding excessive amplification of the system harmonic voltage.

In an embodiment, the controlling a second alternating current switch of at least one of the N inverters to be turned on, to enable the current THD to be less than the preset threshold includes: after a second alternating current switch of one of the N inverters is turned on, repeatedly performing operation 1 and operation 2 until the current THD is less than or equal to the preset threshold.

Each time after a second alternating current switch of the inverter is turned on, the current THD is determined in time. When the current THD cannot meet a requirement, the current THD is reduced by continuing to turn on a second alternating current switch of the inverter, to enable the current THD to be less than or equal to the preset threshold.

In this application, the harmonic distortion can be flexibly suppressed by controlling the alternating current switch to be turned off or turned on.

In an embodiment, the method further includes: when the current THD is less than or equal to the preset threshold, determining whether an output voltage of the inverter meets a grid-tied power generating condition; and when the output voltage of the inverter meets the grid-tied power generating condition, turning on a first alternating current switch and a second alternating current switch that are remaining alternating current switches not turned on in the N inverters.

When the direct current system meets a power generating condition, an alternating current switch that is not turned on in the inverter may be turned on, to constitute a complete circuit, so that the inverter can convert a direct current generated by the direct current system into an alternating current, and transmit the alternating current to the alternating current system.

The direct current system may be a power generating system, for example, a wind power generating system or a photovoltaic power generating system.

That the direct current system meets the power generating condition may mean that the power generating system can normally generate power. For example, when the direct current system is the wind power generating system, that the direct current system meets the power generation condition may mean that a wind power level reaches a preset requirement and a fan can normally generate power.

DESCRIPTION OF EMBODIMENTS

The following describes the technical solutions of this application with reference to the accompanying drawings.

The following describes in detail an inverter in the embodiments of this application with reference to FIG. 1 to FIG. 5.

Figure 1:
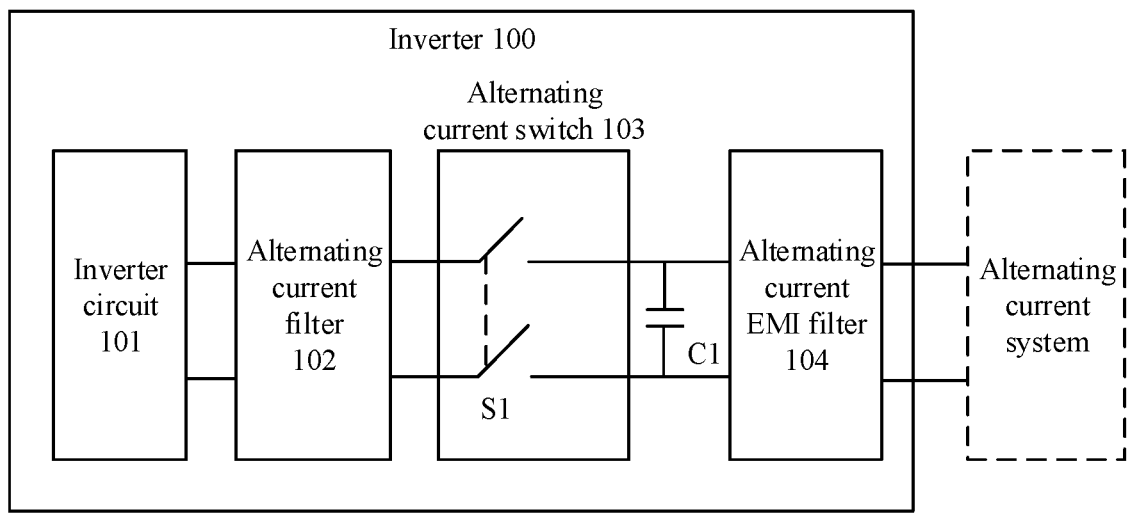
FIG. 1 is a schematic block diagram of an inverter according to an embodiment of this application.

FIG. 1 is a schematic block diagram of an inverter according to an embodiment of this application. An inverter 100 shown in FIG. 1 specifically includes: an inverter circuit 101, an alternating current filter 102, an alternating current switch 103, and an alternating current EMI filter 104.

An output port of the inverter circuit 101 is connected to an input port of the alternating current filter 102, and the alternating current switch 103 is connected between an output port of the alternating current filter 102 and an input port of the alternating current EMI filter 104. Specifically, the alternating current switch 103 may be specifically a first alternating current switch S1.

In addition, the inverter 100 further includes a first split capacitor C1, and C1 is disposed between S1 and the input port of the alternating current EMI filter 104. When S1 is turned off, C1 is disconnected from the output port of the alternating current filter 102, and C1 is connected to a circuit in which an alternating current system connected to the output port of the alternating current EMI filter 104 is located, to suppress harmonic distortion of the alternating current system. When S1 is turned on, the first split capacitor is connected to the output port of the alternating current filter. In this case, the first split capacitor constitutes a filter capacitor of the alternating current filter.

As shown in FIG. 1, an output port of the inverter 100 (specifically, the output port of the alternating current EMI filter) may further be connected to the alternating current system. The inverter 100 may convert a direct current into an alternating current by using the inverter circuit 101, perform, by using the alternating current filter 102 and the alternating current EMI filter 104, filtering processing on the alternating current obtained through conversion by using the inverter circuit 101, and transmit an alternating current obtained after filtering processing to the alternating current system. The alternating current system may be used for power supply after obtaining the alternating current.

It should be understood that C1 is a capacitor of the alternating current filter, but C1 is disposed outside the output port of the alternating current filter 102. When S1 is turned on, C1 actually constitutes the filter capacitor of the alternating current filter.

In an embodiment, C1 is all capacitors or some capacitors of the alternating current filter.

When C1 is the some capacitors of the alternating current filter, in addition to C1, the alternating current filter 102 may further include another capacitor, and the another capacitor may be located between the input port and the output port of the alternating current filter 102.

In an embodiment, the first split capacitor may be a single-phase capacitor or may be a three-phase capacitor.

When the first split capacitor is the single-phase capacitor, the first alternating current switch is a single-phase alternating current switch. When the first split capacitor is the three-phase capacitor, the first alternating current switch is a three-phase alternating current switch, and the first split capacitor is constituted by three-phase branch capacitors. Specifically, when the first split capacitor is the three-phase capacitor, the first split capacitor may be constituted by a first branch capacitor, a second branch capacitor, and a third branch capacitor.

In an embodiment, when the first alternating current switch is turned off, the first split capacitor is connected to the circuit in which the alternating current system is located, and can change a capacitance value of the circuit in which the alternating current system is located, so that the harmonic distortion of the alternating current system can be suppressed.

Further, in an embodiment, the harmonic distortion of the alternating current system can be suppressed by disposing an original capacitor and an original switch of the alternating current filter, and no additional component is added. Therefore, no additional hardware costs or power consumption is caused.

It should be understood that when the first split capacitor is connected to the circuit in which the alternating current system is located, a resonance frequency of a resonant branch of the alternating current system can be changed, thereby staggering a frequency band in which a harmonic voltage of the alternating current system is located, and suppressing the harmonic distortion of the alternating current system. Specifically, the resonance frequency of the resonant branch of the alternating current system is related to a capacitor and an inductor that are included in the resonant branch. After the first split capacitor is connected to the alternating current system, a capacitance value of the resonant branch of the alternating current system is changed, so that the resonance frequency of the resonant branch of the alternating current system is also changed.

Further, as shown in FIG. 1, the output port of the alternating current filter 102 is connected to the input port of the alternating current EMI filter 104 by using S1, C1 is connected in parallel to the input port of the alternating current EMI filter 104, and C1 is connected in parallel to the output port of the alternating current filter 102 by using S1.

As shown in FIG. 1, because S1 is disposed between the alternating current filter 102 and the alternating current EMI filter 104, when S1 is turned off, the output port of the alternating current filter 102 is disconnected from the input port of the alternating current EMI filter 104; or when S1 is turned on, the output port of the alternating current filter 102 is connected to the input port of the alternating current EMI filter 104.

Figure 2:
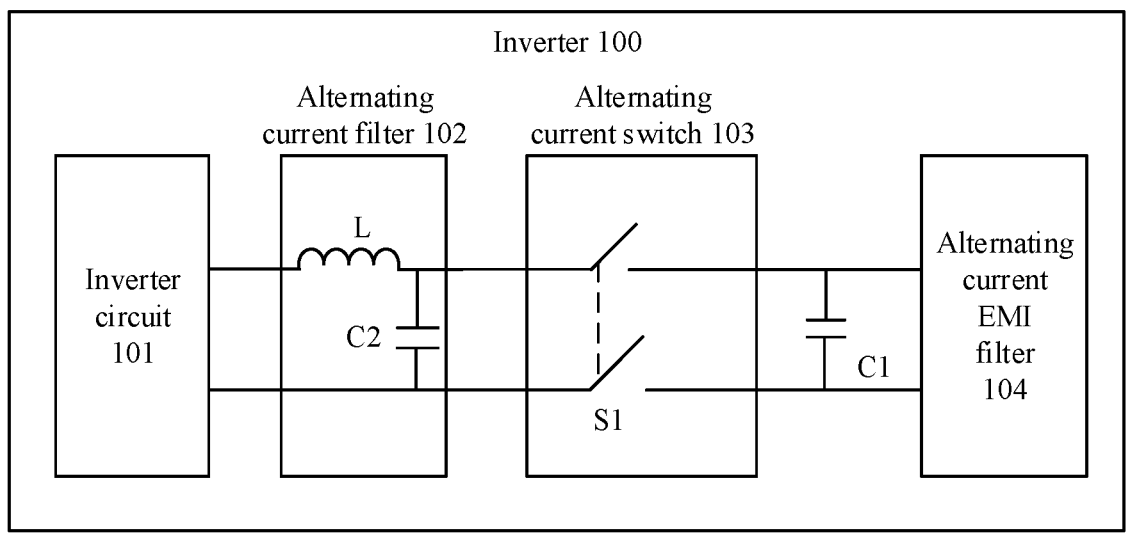
FIG. 2 is a schematic block diagram of an inverter according to an embodiment of this application.

In an embodiment, as shown in FIG. 2, the alternating current filter 102 includes an inductor L connected in series between the input port and the output port of the alternating current filter 102 and includes a second split capacitor C2, and C2 is connected in parallel between the input port and the output port of the alternating current filter 102 and disposed between the inductor L and the output port of the alternating current filter; and when S1 is turned off, C2 constitutes the filter capacitor of the alternating current filter 102; or when S1 is turned on, C1 and C2 are connected in parallel and then connected in series to the inductor L, to jointly constitute the filter capacitor of the alternating current filter 102. The filter capacitor of the alternating current filter 102 is configured to filter an alternating current obtained through inversion by the inverter circuit 102.

In the inverter shown in FIG. 2, S1 can be used to flexibly control whether the some filter capacitors of the alternating current filter are connected to the alternating current system or constitute the filter capacitor of the alternating current filter, and to flexibly control that the some capacitors of the alternating current filter are connected to the alternating current system when the harmonic distortion needs to be suppressed.

In an embodiment, in addition to the first alternating current switch S1, the alternating current switch 103 may further include a second alternating current switch S2.

Figure 3:
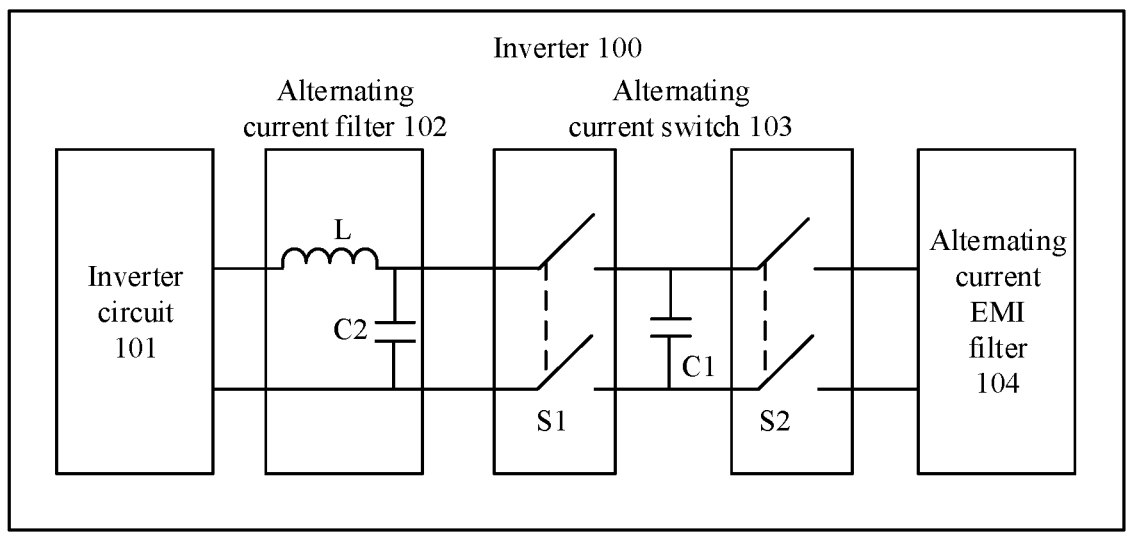
FIG. 3 is a schematic block diagram of an inverter according to an embodiment of this application.

In an embodiment, as shown in FIG. 3, in addition to S1, the alternating current switch 103 in the inverter 100 further includes the second alternating current switch S2, S2 is disposed between S1 and the input port of the alternating current EMI filter 104, and C1 is disposed between S1 and S2; and when S1 is turned off and S2 is turned on, C1 is disconnected from the output port of the alternating current filter 102, and C1 is connected to a circuit in which an alternating current system connected to the output port of the inverter 100 is located, to change a capacitance value of the circuit in which the alternating current system is located; or when S1 is turned on and S2 is turned off, C1 and C2 are connected in parallel and then connected in series to the inductor L of the filter, to jointly constitute the filter capacitor of the alternating current filter 102.

In an embodiment, when S1 is turned off and S2 is turned on, C1 is connected to the circuit in which the alternating current system is located, so that the capacitance value of the resonant branch of the alternating current system can be changed, and the resonant frequency of the resonant branch of the alternating current system can be changed, thereby suppressing the harmonic distortion of the alternating current system.

In the inverter shown in FIG. 3, constitution of the filter capacitor of the alternating current filter can be more conveniently adjusted by using the two alternating current switches.

Further, as shown in FIG. 3, when the alternating current switch 103 includes S1 and S2, and the filter capacitor of the alternating current filter 102 includes C1 and C2, the output port of the alternating current filter 102 is connected to the input port of the alternating current EMI filter 104 by using S1 and S2, C1 is connected in parallel to the output port of the alternating current filter 102 by using S1, and C1 is connected in parallel to the input port of the alternating current EMI filter 104 by using S2.

In an embodiment, C1 and C2 each may be a single capacitor, or may be constituted by connecting a plurality of capacitors in parallel.

Figure 4:
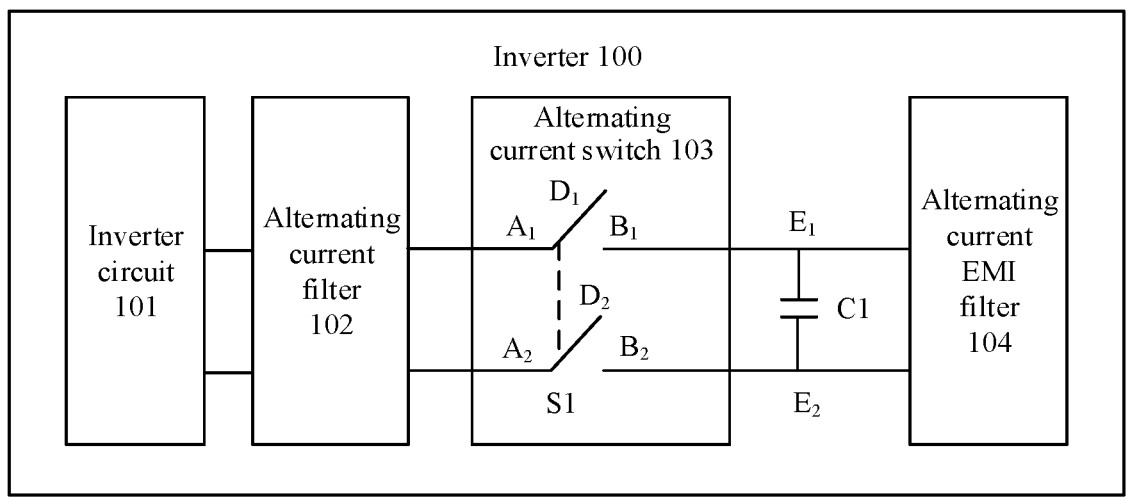
FIG. 4 is a schematic block diagram of an inverter according to an embodiment of this application.
Figure 5:
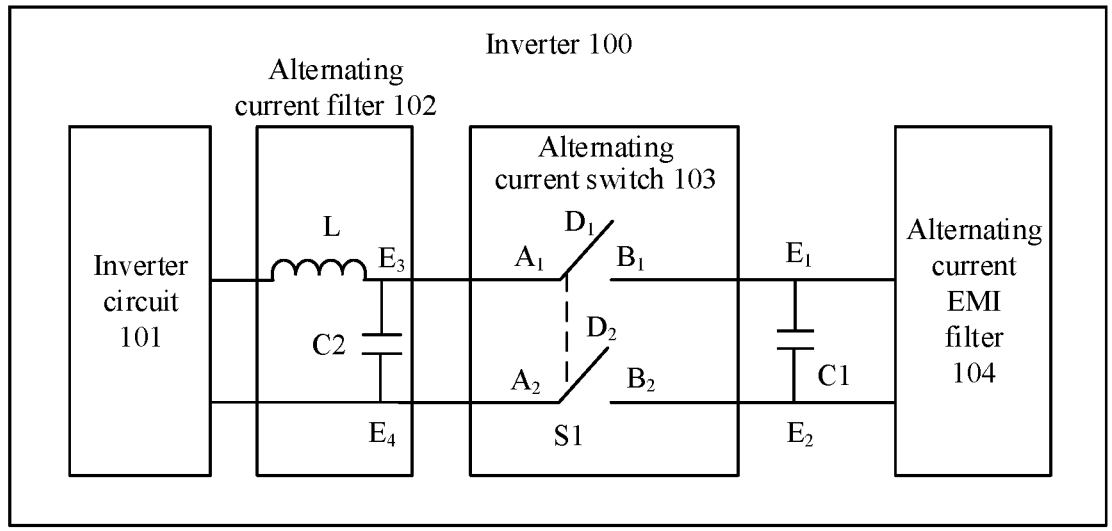
FIG. 5 is a schematic block diagram of an inverter according to an embodiment of this application.
Figure 6:
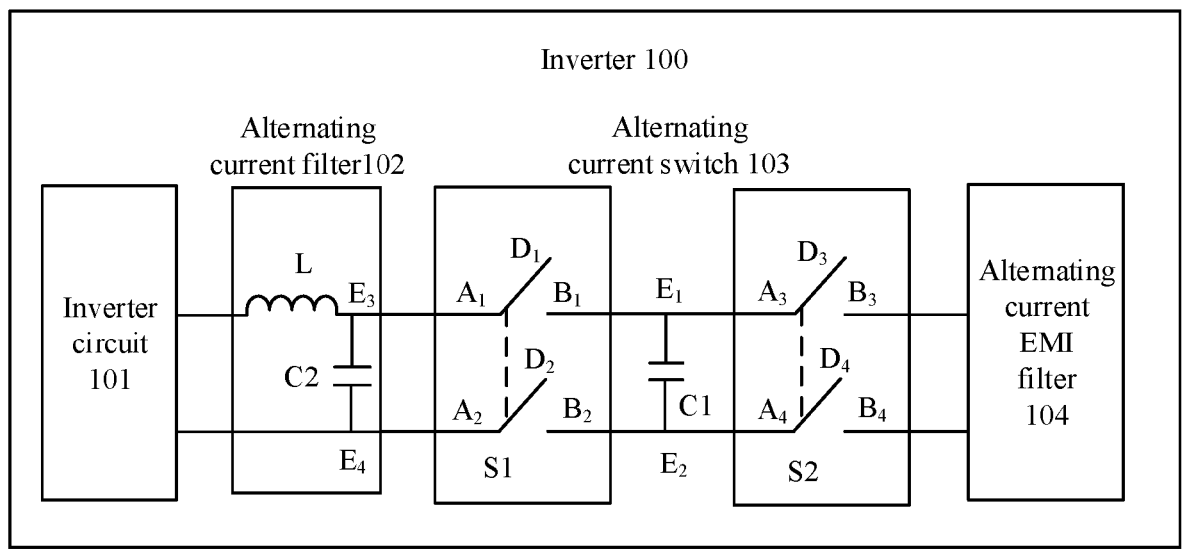
FIG. 6 is a schematic block diagram of an inverter according to an embodiment of this application.

In an embodiment, the alternating current switch 103 may include only S1, or may include both S1 and S2. When a quantity of switches included by the alternating current switch 103 differs, a specific structure of the alternating current switch 103 differs. With reference to FIG. 4 to FIG. 6, the following describes in detail the specific structure of the alternating current switch 103 and a connection relationship among the alternating current switch 103, the alternating current filter 102, and the alternating current EMI filter 104.

As shown in FIG. 4, the alternating current switch 103 includes a single-phase alternating current switch S1. Fixed ends of S1 include A1, A2, B1, and B2, and movable ends of S1 include D1 and D2. C1 is a single-phase capacitor, and two ends of C1 are E1 and E2. D1 and D2 are respectively connected to the fixed ends A1 and A2. When the movable ends D1 and D2 of S1 are respectively connected to the fixed ends B1 and B2 of S1, S1 is turned on. In this case, the fixed ends A1 and A2 are respectively connected to the fixed ends B1 and B2, to implement conduction of S1. In this way, the output port of the alternating current filter 102 is connected to the input port of the alternating current EMI filter 104. In addition, E1 and E2 are respectively connected to the fixed ends B1 and B2 of S1, and E1 and E2 are further directly connected to the input port of the alternating current EMI filter 104.

As shown in FIG. 5, the filter capacitor of the alternating current filter 102 includes a second split capacitor C2. Connection relationships between fixed ends and movable ends of S1 are the same as those in FIG. 4. C1 and C2 each are a single-phase capacitor. C1 has two ends E1 and E2, and C2 has two ends E3 and E4. E1 and E2 are respectively connected to fixed ends B1 and B2 of S1, E1 and E2 are further directly connected to the input port of the alternating current EMI filter 104, and E3 and E4 are respectively connected to fixed ends A1 and A2 of S1.

As shown in FIG. 6, the alternating current switch 103 includes single-phase alternating current switches S1 and S2, and S1 and S2 are disposed between the output port of the alternating current filter 102 and the input port of the alternating current EMI filter 104. C1 and C2 each are a single-phase capacitor, C1 is located between S1 and S2, and C2 is disposed between the input port and the output port of the alternating current filter 102.

In FIG. 6, fixed ends of S1 include A1, A2, B1, and B2, movable ends of S1 include D1 and D2. Fixed ends of S2 include A3, A4, B3, and B4, and movable ends of S2 include D3 and D4. Two ends of C1 are E1 and E2, and two ends of C2 are E3 and E4. For S1, D1 and D2 are respectively connected to A1 and A2. When D1 and D2 are respectively connected to B1 and B2, S1 is turned on. For S2, D3 and D4 are respectively connected to A3 and A4. When D3 and D4 are respectively connected to B3 and B4, S2 is turned on. For C1, E1 and E2 are respectively connected to B1 and B2, E1 and E2 are respectively connected to A3 and A4, and E3 and E4 are respectively connected to the fixed ends A1 and A2 of S1.

Figure 7:
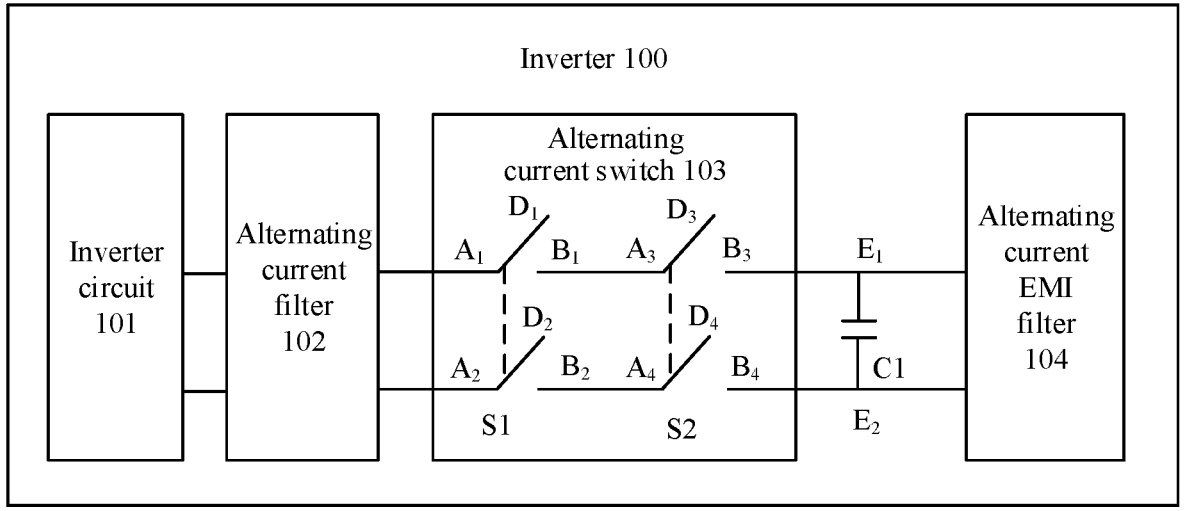
FIG. 7 is a schematic block diagram of an inverter according to an embodiment of this application.

In an embodiment, C1 may be alternatively disposed between S2 and the input port of the alternating current EMI filter 104. As shown in FIG. 7, the alternating current switch 103 includes S1 and S2, and connection relationships between fixed ends and movable ends of S1 and S2 are the same as those in FIG. 6. In FIG. 7, two ends E1 and E2 of C1 are respectively connected to movable ends B3 and B4 of S2, and E1 and E2 are further separately connected to the input port of the alternating current EMI filter 104. It should be understood that the inverter shown in FIG. 7 may further include C2, and a port included by C2 and a connection relationship between C2 and another port may be as shown in FIG. 6.

The alternating current switch 103 shown in FIG. 7 is the same as the alternating current switch 103 shown in FIG. 6. A difference lies in that, in FIG. 6, C1 is located between S1 and S2, but in FIG. 7, C1 is located between S2 and the alternating current EMI filter 104.

Figure 8:
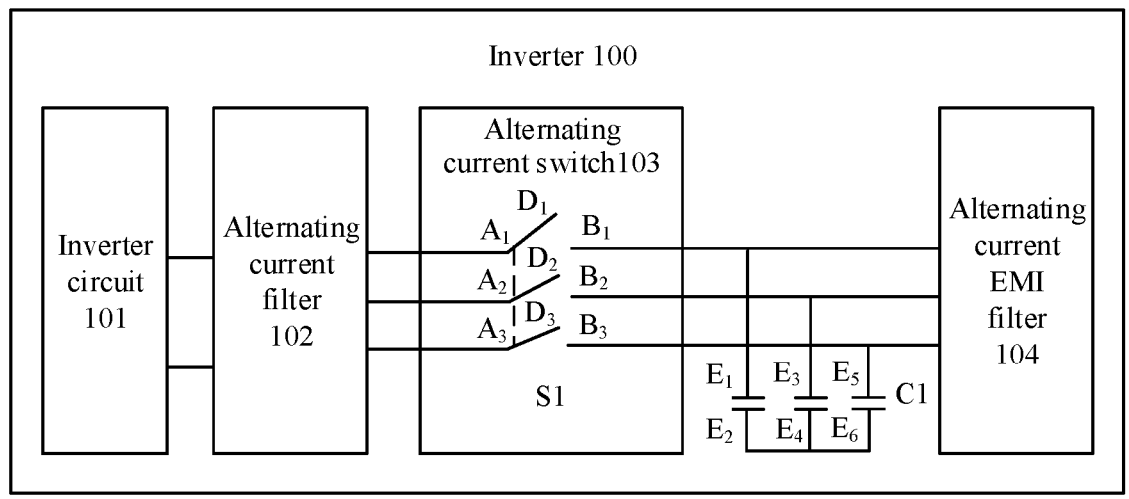
FIG. 8 is a schematic block diagram of an inverter according to an embodiment of this application.
Figure 9:
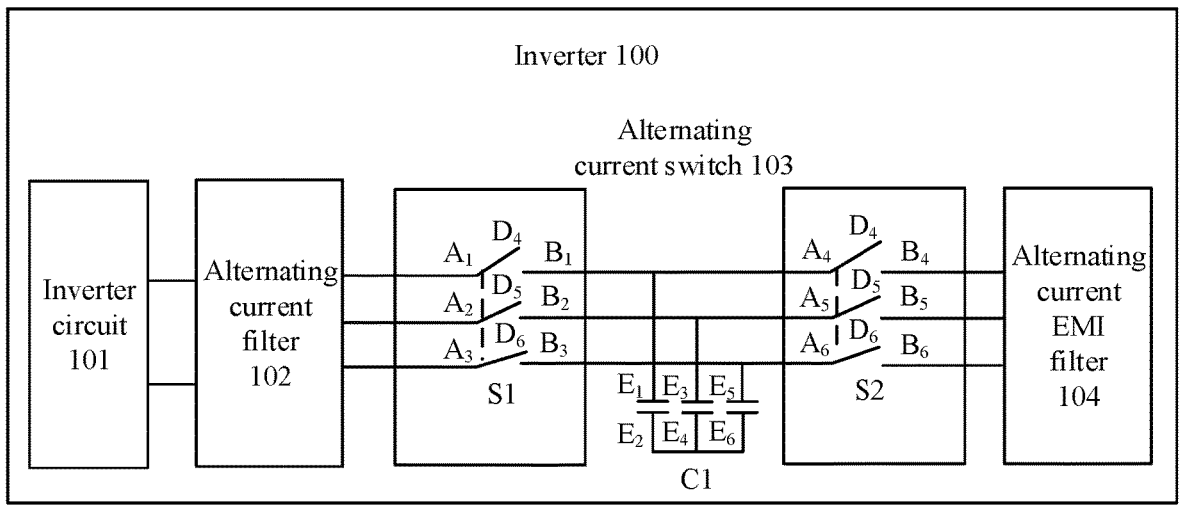
FIG. 9 is a schematic block diagram of an inverter according to an embodiment of this application.

With reference to FIG. 1 to FIG. 7, the foregoing describes a case in which the filter capacitor in the alternating current filter 102 is the single-phase capacitor, and the alternating current switch included by the alternating current switch 103 is the single-phase alternating current switch. Optionally, the filter capacitor in the alternating current filter 102 may alternatively be a three-phase capacitor, and the alternating current switch in the alternating current switch 103 may alternatively be a three-phase alternating current switch. With reference to FIG. 8 and FIG. 9, the following describes in detail a case in which the filter capacitor is the three-phase capacitor and the alternating current switch is the three-phase alternating current switch.

As shown in FIG. 8, the alternating current switch 103 includes a first alternating current switch S1, fixed ends of S1 include A1, A2, A3, B1, B2, and B3, and movable ends of S1 include D1, D2, and D3. When the movable ends D1, D2, and D3 of S1 are respectively connected to the fixed ends B1, B2, and B3 of S1, S1 is turned on. In this case, the fixed ends A1, A2, and A3 are respectively connected to the fixed ends B1, B2, and B3, to implement conduction of S1. In this way, the output port of the alternating current filter 102 is connected to the input port of the alternating current EMI filter 104.

In FIG. 8, C1 is a three-phase capacitor, and C1 is constituted by a first branch capacitor, a second branch capacitor, and a third branch capacitor. The first branch capacitor includes a first end E1 and a second end E2, the second branch capacitor includes a third end E3 and a fourth end E4, and the third branch capacitor includes a fifth end E5 and a sixth end E6. E1, E3, and E5 are respectively connected to the fixed ends B1, B2, and B3, and E2, E4, and E6 are connected to each other.

As shown in FIG. 9, the alternating current switch 103 includes a first alternating current switch S1 and a second alternating current switch S2. Fixed ends of S1 include A1, A2, A3, B1, B2, and B3, and movable ends of S1 include D1, D2, and D3. Fixed ends of S1 include A1, A2, A3, B1, B2, and B3, and movable ends of S1 include D1, D2, and D3. Fixed ends of S2 include A4, A5, A6, B4, B5, and B6, and movable ends of S2 include D4, D5, and D6.

In FIG. 9, C1 is a three-phase capacitor, and C1 is constituted by a first branch capacitor, a second branch capacitor, and a third branch capacitor. A first end to a sixth end of C1 are E1, E2, E3, E4, E5, and E6. E1, E3, and E5 are respectively connected to the fixed ends B1, B2, and B3. E1, E3, and E5 are further respectively connected to the fixed ends B4, B5, and B6. E2, E4, and E6 are connected to each other.

In an embodiment, a capacitance value of the first split capacitor is K times a capacitance value of the filter capacitor, where K is a value that enables the harmonic distortion of the alternating current system to be less than preset harmonic distortion.

It should be understood that the value of K is an integer greater than 0 and less than or equal to 1, and the value of K may be obtained based on an actual test. Specifically, in the actual test, the value of K may be set, and a ratio of the first split capacitor to the filter capacitor when the harmonic distortion of the alternating current system meets a preset requirement is determined as the value of K.

In addition to obtaining the value of K based on the actual test, the value of K may be estimated based on an equivalent capacitor of the alternating current EMI filter, an equivalent inductor of the alternating current system, and a harmonic of the alternating current system.

For example, the capacitance value of the first split capacitor is C1, the capacitance value of the filter capacitor is C, and C1=K×C. It is assumed that a frequency of a system harmonic of the alternating current system is 2 kHz. When K=0.2, a frequency band in which a minimum impedance of the alternating current system is located is also 2 kHz. When K is greater than or equal to 0.2, a frequency band in which a minimum impedance of the alternating current system is located is gradually away from a frequency band in which the system harmonic is located, thereby avoiding excessive amplification of the system harmonic. Therefore, when the value of K is set, the value of K may be set to a comparatively large value (for example, the value of K is set to a value close to 1) depending on a situation.

When the inverter in any one of FIG. 1 to FIG. 9, a direct current system, and an alternating current system jointly constitute a grid-tied power generating system, if all alternating current switches in the inverter are turned off, manners of suppressing the harmonic distortion of the alternating current system by the grid-tied power generating system constituted by the inverter shown in any of FIG. 1 to FIG. 9 are different, the following describes in detail the manners of suppressing the harmonic distortion of the alternating current systems by the grid-tied power generating system constituted by the inverter shown in any of FIG. 1 to FIG. 9.

When the inverter shown in FIG. 1, FIG. 5, FIG. 7, FIG. 8, or FIG. 11, a direct current system, and an alternating current system jointly constitute a grid-tied power generating system, to suppress the harmonic distortion of the alternating current system, S1 may be kept turned off (in an initial state, S1 is turned off, and no operation needs to be performed on S1 at this time). In this case, C1 is disconnected from the alternating current filter 102, and is connected to an alternating current system in which the alternating current EMI filter 104 is located, so that the harmonic distortion of the alternating current system can be suppressed.

Figure 12:
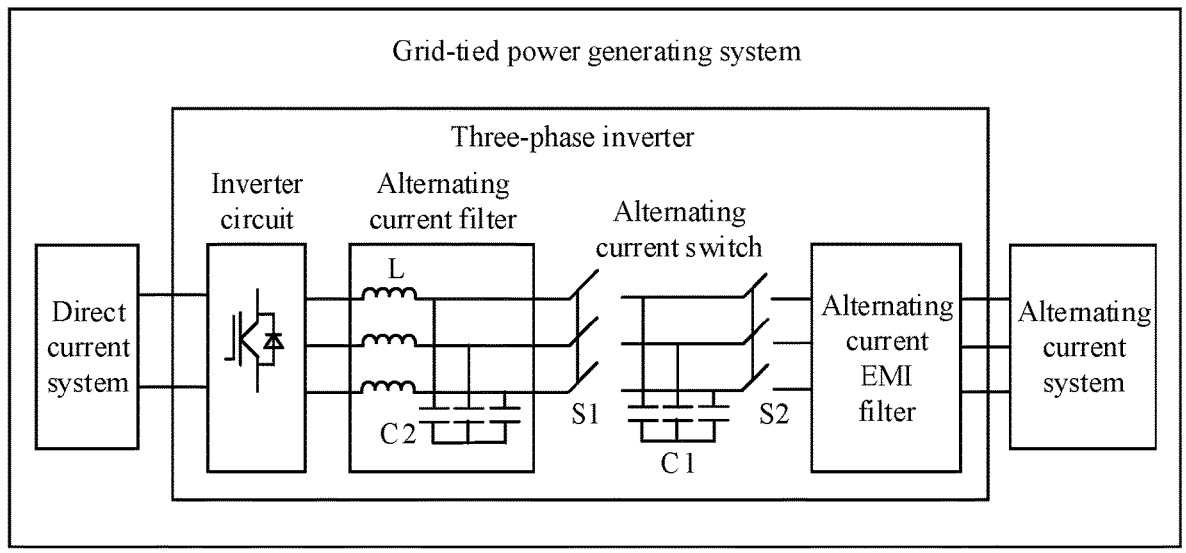
FIG. 12 is a schematic block diagram of a grid-tied power generating system according to an embodiment of this application.

When the inverter shown in FIG. 3, FIG. 9, or FIG. 12, a direct current system, and an alternating current system jointly constitute a grid-tied power generating system, to suppress the harmonic distortion of the alternating current system, S1 may be kept turned off and S2 may be turned on (in an initial state, both S1 and S2 are turned off, and in this case, only S2 needs to be turned on). In this case, C1 is disconnected from the alternating current filter 102, and is connected to an alternating current system in which the alternating current EMI filter 104 is located, so that the harmonic distortion of the alternating current system can be suppressed.

When the inverter shown in FIG. 7, a direct current system, and an alternating current system jointly constitute a grid-tied power generating system, to suppress the harmonic distortion of the alternating current system, S2 may be kept turned off (in an initial state, both S1 and S2 are turned off, and in this case, only S2 needs to be turned off, and S1 may be turned off or may be turned on). In this case, C1 is disconnected from the alternating current filter 102, and is connected to an alternating current system in which the alternating current EMI filter 104 is located, so that the harmonic distortion of the alternating current system can be suppressed.

Figure 10:
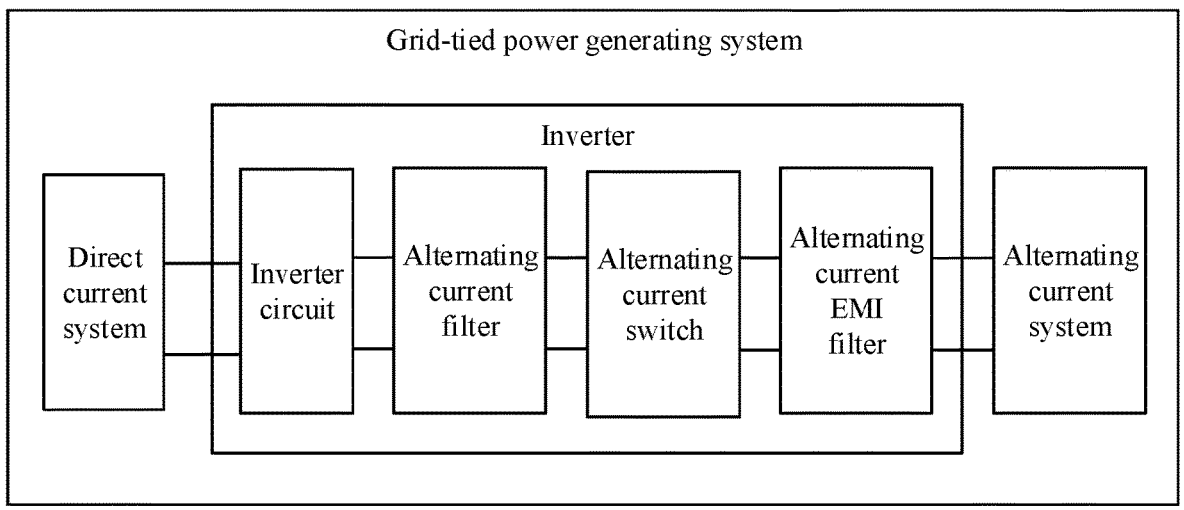
FIG. 10 is a schematic block diagram of a grid-tied power generating system according to an embodiment of this application.

This application further provides a grid-tied power generating system. As shown in FIG. 10, the grid-tied power generating system includes a direct current system, an alternating current system, and an inverter. An output port of the direct current system is connected to an input port of the inverter, and an output port of the inverter is connected to an input port of the alternating current system. The direct current system is configured to output a direct current, the inverter is configured to convert the direct current output by the direct current system into an alternating current, and the alternating current system is configured to provide the alternating current.

The alternating current system in FIG. 10 may be specifically an alternating current system and is configured to provide the alternating current.

It should be understood that the inverter shown in FIG. 10 may be any one of the inverters shown in any of FIG. 1 to FIG. 9. A limitation and an explanation of the inverter in the embodiments of this application are also applicable to the inverter in the grid-tied power generating system shown in FIG. 10.

In an embodiment, an alternating current switch in the grid-tied power generating system is set to be turned off, a first split capacitor may be disconnected from an alternating current filter, and the first split capacitor is connected to a circuit in which an alternating current system connected to the input port of the inverter is located, so that distortion of the alternating current system can be suppressed.

The inverter in the grid-tied power generating system in this embodiment of this application may be a single-phase inverter or may be a three-phase inverter.

Figure 11:
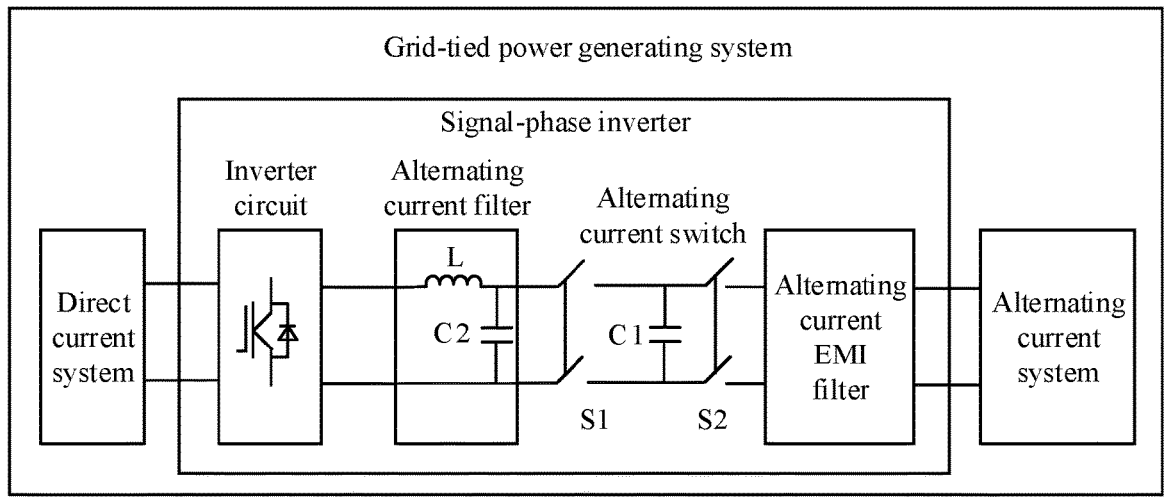
FIG. 11 is a schematic block diagram of a grid-tied power generating system according to an embodiment of this application.

As shown in FIG. 11, a filter capacitor of the alternating current filter includes a first single-phase split capacitor C1 and a second single-phase split capacitor C2, and the alternating current switch includes a first single-phase alternating current switch S1 and a second single-phase alternating current switch S2.

The second single-phase split capacitor C2 is connected in parallel to a single-phase filter inductor L. The parallel branch may be considered as a whole. A front end point of the parallel branch is connected to an alternating current side of an inverter circuit, and a back end point is sequentially connected in series to the first single-phase alternating current switch S1 of the alternating current switch. The first single-phase split capacitor C1 is connected in parallel to the first single-phase alternating current switch S1, the parallel branch may be considered as a whole, and the parallel branch is sequentially connected in series to the second single-phase alternating current switch S2 of the alternating current switch.

When the single-phase inverter is off-grid, the second single-phase alternating current switch S2 of the alternating current switch may be controlled to be turned on, to connect the first single-phase split capacitor C1 to the alternating current system, and dynamically change a resonance frequency of a resonant branch of the alternating current system, thereby staggering a frequency band in which a system harmonic voltage is located. This avoids excessive amplification of the system harmonic voltage and ensures that the single-phase inverter automatically starts.

It should be understood that the first single-phase split capacitor C1 shown in FIG. 11 may be equivalent to the foregoing first split capacitor, and the first single-phase split capacitor C1 may be some capacitors of the filter capacitors of the alternating current filter.

As shown in FIG. 12, a filter capacitor includes a first three-phase split capacitor C1 and a second three-phase split capacitor C2, and the alternating current switch includes a first three-phase alternating current switch S1 and a second three-phase alternating current switch S2.

The second three-phase split capacitor C2 is connected in parallel to a three-phase filter inductor L. The parallel branch may be considered as a whole. A front end point of the parallel branch is connected to an alternating current side of an inverter circuit, and a back end point is sequentially connected in series to the first three-phase alternating current switch S1 of the alternating current switch. The first three-phase split capacitor C1 is connected in parallel to the first three-phase alternating current switch S1, the parallel branch may be considered as a whole, and the parallel branch is sequentially connected in series to the second three-phase alternating current switch S2 of the alternating current switch.

When the three-phase inverter is off-grid, the second three-phase alternating current switch S2 of the alternating current switch may be controlled to be turned on, to connect the first three-phase split capacitor C1 to the alternating current system, and dynamically change a resonance frequency of a resonant branch of the alternating current system, thereby staggering a frequency band in which a system harmonic voltage is located. This avoids excessive amplification of the system harmonic voltage and ensures that the three-phase inverter automatically starts.

It should be understood that the first three-phase split capacitor C1 shown in FIG. 12 may be equivalent to the foregoing first split capacitor, and the first three-phase split capacitor C1 may be some capacitors of the filter capacitors of the alternating current filter.

The grid-tied power generating system may include one inverter or may include a plurality of inverters. It should be understood that, in the grid-tied power generating system, one direct current system corresponds to one inverter, and each inverter is configured to convert a direct current output by a corresponding direct current system into an alternating current. However, there may be only one alternating current system, and finally, alternating currents obtained through conversion by the plurality of inverters may be input into the alternating current system.

This application further provides a grid-tied power generating system, where the grid-tied power generating system includes an alternating current system, N inverters according to the embodiments of this application, and N direct current systems, output ports of the N direct current systems are connected to input ports of the N inverters in a one-to-one manner, and N is an integer greater than or equal to 1, and output ports of the N inverters are connected to an input port of an alternating current system.

Figure 13:
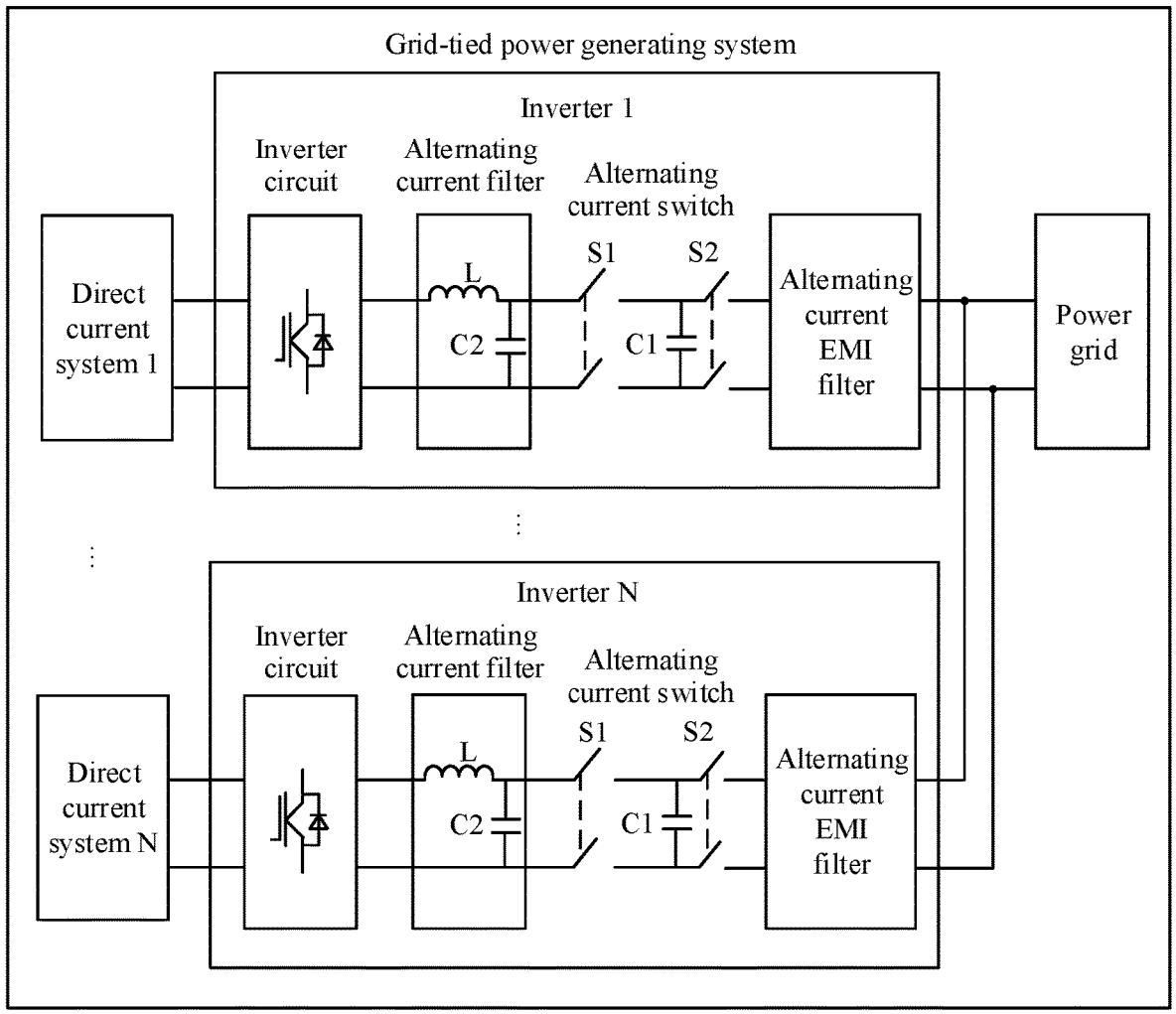
FIG. 13 is a schematic block diagram of a grid-tied power generating system according to an embodiment of this application.

In an embodiment, as shown in FIG. 13, a grid-tied power generating system includes N direct current systems (a direct current system 1 to a direct current system N, where N is an integer greater than or equal to 1) in total. The direct current system 1 to the direct current system N are respectively corresponding to an inverter 1 to an inverter N. The inverter 1 to the inverter N respectively convert direct currents input by the direct current system 1 to the direct current system N into alternating currents. Finally, the inverter 1 to the inverter N output the alternating currents obtained through conversion to an alternating current system. The alternating current system in this embodiment of the present invention is a power grid, for example, the State Grid. In the grid-tied power generating system, the direct current generated by the direct current system, such as a photovoltaic solar panel or a wind turbine generator, is converted into an alternating current of a specific voltage and a specific working frequency by using the inverter, and then the alternating current is connected to the power grid.

The grid-tied power generating system shown in FIG. 13 is a grid-tied power generating system constituted by N single-phase inverters, the N direct current systems, and the power grid.

In an embodiment, the grid-tied power generating system in this embodiment of this application may alternatively be constituted by N three-phase inverters, the N direct current systems, and the power grid.

To resolve harmonic distortion of a power grid when an inverter is off-grid, this application provides a method for suppressing the harmonic distortion of the power grid. In a case of the harmonic distortion of the power grid, some capacitors of filter capacitors of the inverter are connected to the power grid by operating an alternating current switch, thereby reducing the harmonic distortion of the power grid.

Figure 14:
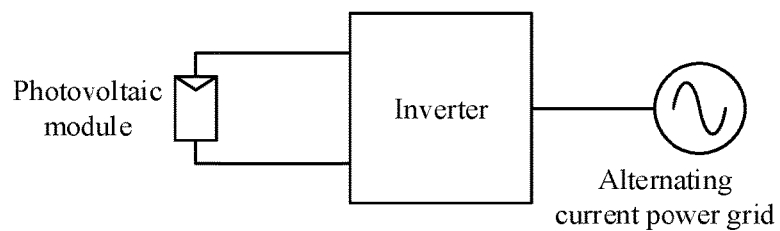
FIG. 14 is a schematic block diagram of a photovoltaic power generating system according to an embodiment of this application.

An embodiment of this application further provides a photovoltaic power generating system. As shown in FIG. 14, the photovoltaic power generating system includes a photovoltaic module, an alternating current power grid, and the inverter in the embodiments of this application.

An output port of the photovoltaic module is connected to an input port of the inverter, and an output port of the inverter is configured to connect to an input port of the power grid. The photovoltaic module is configured to generate a direct current, the inverter is configured to perform inversion processing on the direct current and input an alternating current obtained through the inversion processing into the power grid, and the power grid is configured to provide the alternating current.

Because the foregoing photovoltaic power generating system uses the inverter in the embodiments of this application, in the photovoltaic power generating system in this embodiment of this application, a first split capacitor can be connected, by controlling an alternating current switch in the inverter, to a circuit in which the power grid is located, so as to change a capacitance value of the circuit in which the power grid is located, to suppress harmonic distortion of the power grid.

The photovoltaic module is a device that directly converts solar energy into electric energy by using a photovoltaic (photovoltaic) effect produced by a semiconductor material in a light condition. The photovoltaic module may also be referred to as a photovoltaic array or a solar panel.

To rectify the direct current generated by the photovoltaic module, a rectifier may be further disposed in the photovoltaic power generating system. The rectifier is connected between the output port of the photovoltaic module and the input port of the inverter. The rectifier is configured to rectify the direct current generated by the photovoltaic module, and input a direct current obtained after rectification into the inverter.

It should be understood that the photovoltaic power generating system in FIG. 14 is equivalent to a specific case of the grid-tied power generating system shown in any one of FIG. 10 to FIG. 13, and the photovoltaic module in the photovoltaic power generating system in FIG. 14 is equivalent to the direct current system in the grid-tied power generating system shown in any of FIG. 10 to FIG. 13.

In addition to the photovoltaic power generating system, the foregoing grid-tied power generating system may be a fan grid-tied power generating system or an energy storage grid-tied power generating system.

Figure 15:
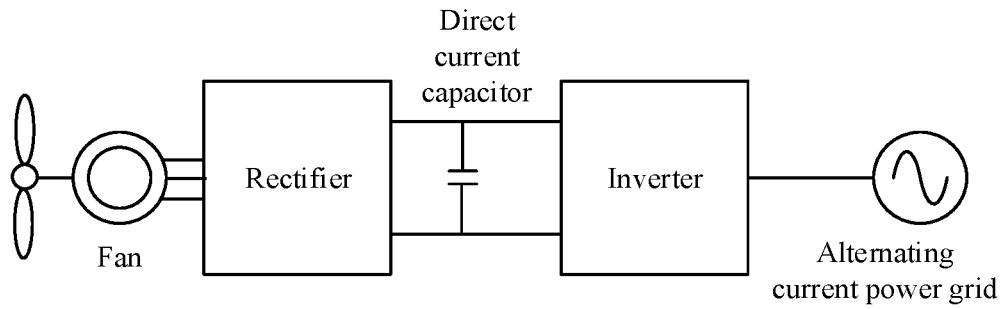
FIG. 15 is a schematic block diagram of a fan grid-tied power generating system according to an embodiment of this application.

As shown in FIG. 15, the foregoing grid-tied power generating system may be specifically the fan grid-tied power generating system. The inverter in the embodiments of this application may be applied to the fan grid-tied power generating system. In the fan grid-tied power generating system, a rectifier may rectify an alternating current output by the fan grid-tied power generating system, to obtain a direct current. Then, direct current voltage regulation is performed on the direct current by using a direct current capacitor. Finally, the inverter is configured to convert a direct current obtained through direct current voltage regulation into an alternating current, and transmit the alternating current to an alternating current power grid. A fan in FIG. 15 is equivalent to the direct current system in the grid-tied power generating system shown in any of FIG. 10 to FIG. 13, and is configured to generate the direct current.

Figure 16:
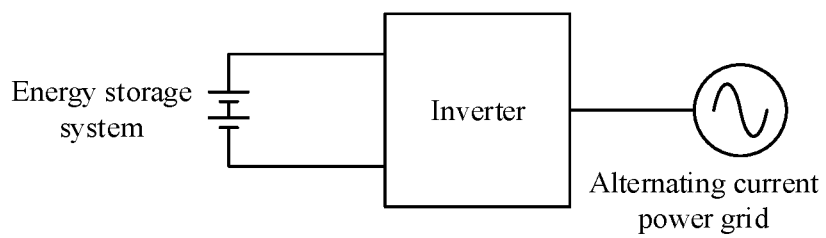
FIG. 16 is a schematic block diagram of an energy storage grid-tied power generating system according to an embodiment of this application.

As shown in FIG. 16, the grid-tied power generating system may be specifically the energy storage grid-tied power generating system. The inverter in the embodiments of this application may be applied to the energy storage grid-tied power generating system, and the energy storage grid-tied power generating system is constituted by a storage system, the inverter, and an alternating current power grid. In the energy storage grid-tied power generating system, the inverter converts a direct current output by an energy storage system into an alternating current, and transmits the alternating current obtained through conversion to the alternating current power grid. The energy storage system in FIG. 16 is equivalent to the direct current system in the grid-tied power generating system shown in any of FIG. 10 to FIG. 13, and is configured to generate the direct current.

Figure 17:
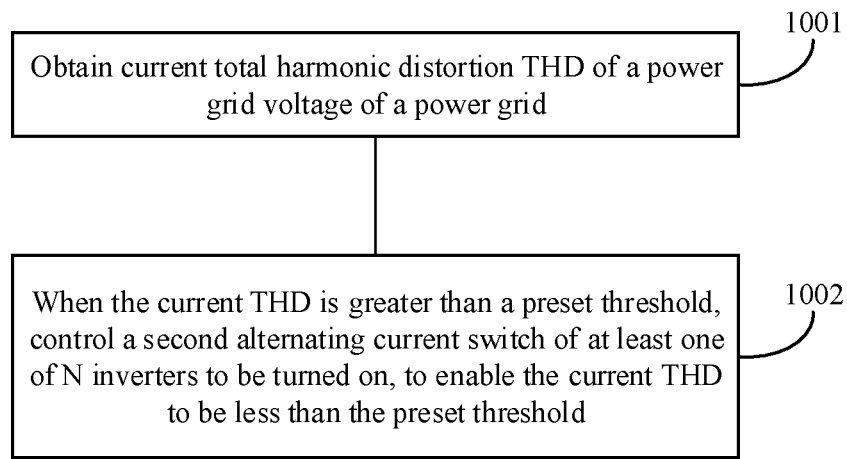
FIG. 17 is a schematic flowchart of a method for suppressing harmonic distortion according to an embodiment of this application.

FIG. 17 is a schematic flowchart of a method for suppressing harmonic distortion according to an embodiment of this application. The method shown in FIG. 17 may be applied to a grid-tied power generating system. The grid-tied power generating system includes N inverters, a direct current system, and a power grid. Input ports of the N inverters are connected to an output port of the direct current system, and output ports of the N inverters are connected to an input port of the power grid. A specific structure of the inverter in the grid-tied power generating system may be as shown in FIG. 6, FIG. 9, or FIG. 12. To be specific, an alternating current switch of the inverter in the grid-tied power generating system to which the method shown in FIG. 17 is applied includes a first alternating current switch and a second alternating current switch. A first split capacitor is disposed between the first alternating current switch and the second alternating current switch. The second alternating current switch is turned on and the first alternating current switch is kept turned off, and the first split capacitor can be connected to a circuit in which the power grid is located.

In an embodiment, the grid-tied power generating system to which the method shown in FIG. 17 is applied may be as shown in FIG. 16.

The method shown in FIG. 17 specifically includes operation 1001 and operation 1002. The following separately describes operation 1001 and operation 1002 in detail.

1001. Obtain current total harmonic distortion THD of a power grid voltage of a power grid.

1002. When the current THD is greater than a preset threshold, control a second alternating current switch of at least one of the N inverters to be turned on, to enable the current THD to be less than the preset threshold.

It should be understood that the second alternating current switch of the at least one of the N inverters is controlled to be turned on, so that a first split capacitor of the at least one inverter can be connected to a circuit in which a power grid connected to an output port of the inverter is located, and the first split capacitor is disconnected from an output port of an alternating current filter, so that harmonic distortion of the power grid can be suppressed. Therefore, the current THD can be reduced by turning on the second alternating current switch of the at least one of the N inverters.

In an embodiment, in the grid-tied power generating system constituted by the N inverters, first split capacitors of some inverters can be connected to the power grid by controlling an alternating current switch of an inverter in the grid-tied power generating system to be turned on, so that the harmonic distortion of the power grid voltage of the power grid can be suppressed.

In an embodiment, when the power grid in the grid-tied power generating system includes a voltage harmonic, the first split capacitor can be connected in parallel to the power grid by controlling the alternating current switch to be turned off or turned on. A resonance frequency of a resonant branch of the system can be dynamically changed, thereby staggering a frequency band in which a system harmonic voltage of the alternating current system is located, and avoiding excessive amplification of the system harmonic voltage.

In an embodiment, the controlling a second alternating current switch of at least one of the N inverters to be turned on, to enable the current THD to be less than the preset threshold includes: after a second alternating current switch of one of the N inverters is turned on, repeatedly performing operation 1001 and operation 1002 until the current THD is less than or equal to the preset threshold.

Each time after a second alternating current switch of the inverter is turned on, the current THD is determined in time. When the current THD cannot meet a requirement, the current THD is reduced by continuing to turn on a second alternating current switch of the inverter, to enable the current THD to be less than or equal to the preset threshold.

It should be understood that in the method for suppressing harmonic distortion in this embodiment of this application, the current THD can be gradually changed by turning on second alternating current switches of the inverters one by one, so that the current THD can finally be less than or equal to the preset threshold, thereby suppressing the harmonic distortion.

In an embodiment, as a quantity of turned-on second alternating current switches increases, more and more first split capacitors are connected to the circuit in which the power grid is located, so that the current THD can be gradually reduced. When the current THD is less than or equal to the preset threshold, turning on of a second alternating current switch of the inverter is stopped, thereby suppressing the harmonic distortion.

In an embodiment, the harmonic distortion can be flexibly suppressed by controlling the alternating current switch to be turned off or turned on.

In an embodiment, when the current THD is less than or equal to the preset threshold, whether an output voltage of the inverter meets a grid-tied power generating condition is determined; and when the output voltage of the inverter meets the grid-tied power generating condition, a first alternating current switch and a second alternating current switch that are remaining alternating current switches not turned on in the N inverters are turned on.

When the direct current system meets a power generating condition, an alternating current switch that is not turned on in the inverter may be turned on, to constitute a complete circuit, so that the inverter can convert a direct current generated by the direct current system into an alternating current, and transmit the alternating current to the power grid.

The direct current system may be a power generating system, for example, a wind power generating system or a photovoltaic power generating system.

That the direct current system meets the power generating condition may mean that the power generating system can normally generate power. For example, when the direct current system is the wind power generating system, that the direct current system meets the power generation condition may mean that a wind power level reaches a preset requirement and a fan can normally generate power.

The method for suppressing harmonic distortion in this embodiment of this application may be applied to a plurality of application scenarios. For example, the method for suppressing harmonic distortion in this embodiment of this application may be applied to two scenarios: a grid-tied operation scenario and an off-grid shutdown scenario. The following describes in detail the method for suppressing harmonic distortion in this embodiment of this application in the two scenarios.

Figure 18:
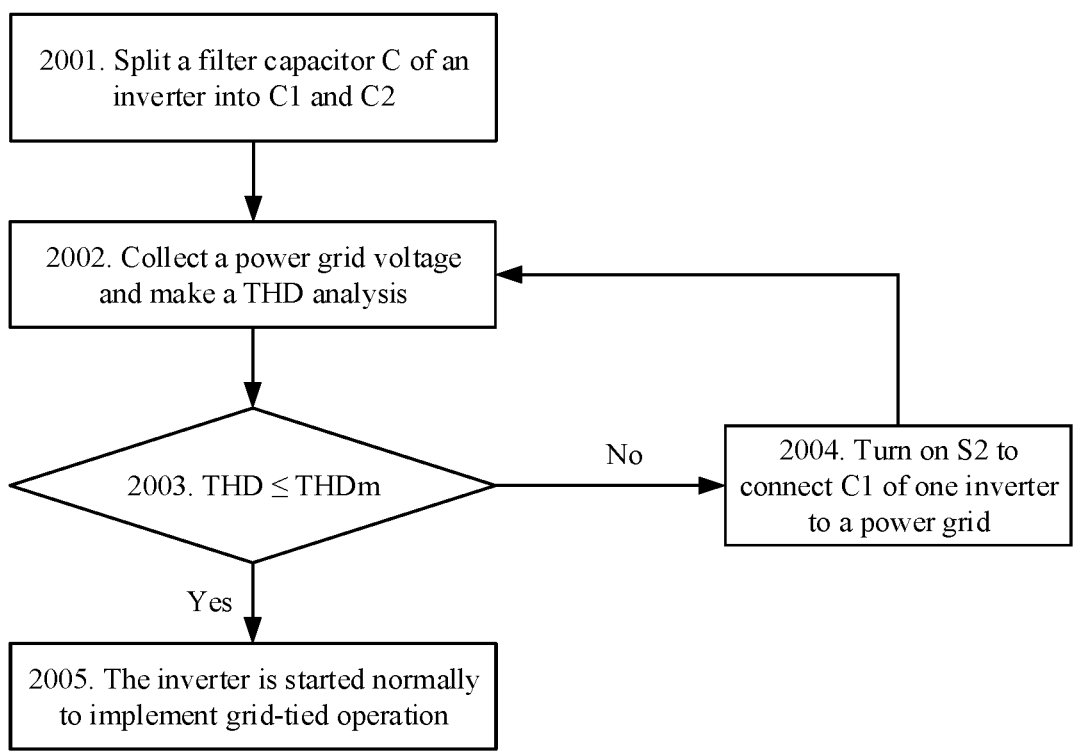
FIG. 18 is a schematic flowchart of a method for suppressing harmonic distortion according to an embodiment of this application.

The following first describes in detail a specific process of the method for suppressing harmonic distortion in this embodiment of this application in the grid-tied operation scenario with reference to FIG. 18.

FIG. 18 is a specific flowchart of the method for suppressing harmonic distortion in the grid-tied operation scenario according to an embodiment of this application. The method shown in FIG. 18 may be applied to the grid-tied power generating system shown in FIG. 16. The method shown in FIG. 18 can be used for performing harmonic suppression on the grid-tied power generating system shown in FIG. 16. The method shown in FIG. 18 specifically includes the following operations.

2001. Split a filter capacitor C of an inverter into C1 and C2.

In an embodiment, a filter capacitor C of the inverter may be split, according to a specific proportion, into a first split capacitor C1 and a second split capacitor C2 that are connected in parallel, where $C1 = K \times C$, $C2 = (1-K) \times C$, and a value range of a split capacitor coefficient K is $(0, 1]$.

2002. Collect a power grid voltage and make a THD analysis, to obtain current THD.

In an embodiment, when the N inverters are off-grid, a power grid voltage of a grid-tied point of each of the N inverters is collected and a THD analysis is made, to obtain current THD of the power grid voltage.

2003. Determine whether the current THD is less than or equal to THDm.

THDm is a specified THD threshold that meets normal starting-up of the inverter. If the current THD is greater than THDm, operation 2004 is performed. If the current THD is less than THDm, operation 2005 is performed.

2004. Turn on S2 to connect C1 of one inverter to the power grid.

After C1 of the first inverter is connected to a power grid system, operation 2002 is performed again to make a THD analysis to obtain current THD, and then operation 2003 is performed again. If the current THD is greater than THDm, operation 2004 is performed again. If the current THD is less than THDm, operation 2005 is performed.

2005. The inverter is started normally to implement grid-tied operation.

If the current THD is less than THDm, the inverter can start normally, so that the inverter in the system is connected to the power grid securely and stably.

Figure 19:
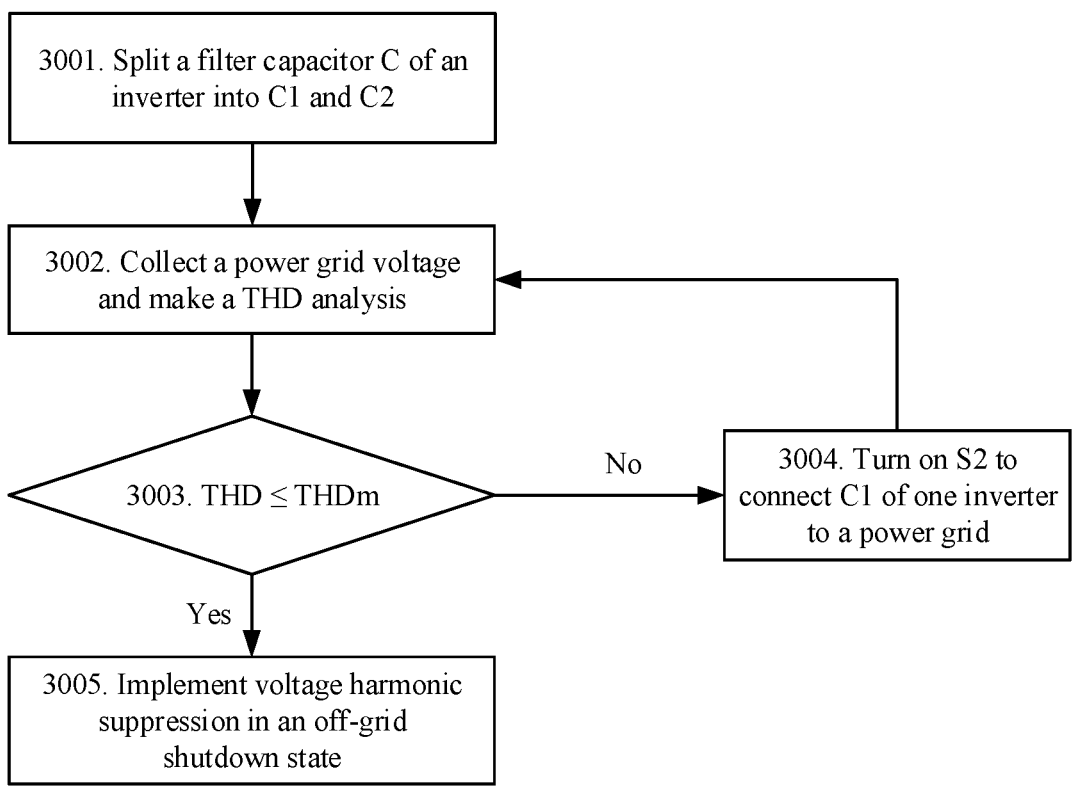
FIG. 19 is a schematic flowchart of a method for suppressing harmonic distortion according to an embodiment of this application.

The following describes in detail a specific process of the method for suppressing harmonic distortion in this embodiment of this application in the off-grid shutdown scenario with reference to FIG. 19.

FIG. 19 is a specific flowchart of the method for suppressing harmonic distortion in the grid-tied operation scenario according to an embodiment of this application. The method shown in FIG. 19 may be applied to the grid-tied power generating system shown in FIG. 16. The method shown in FIG. 19 can be used for performing harmonic suppression on the grid-tied power generating system shown in FIG. 16. A specific procedure of the method shown in FIG. 19 includes the following operations.

3001. Split a filter capacitor C of an inverter into C1 and C2.

Specifically, a filter capacitor C of the inverter may be split, according to a specific proportion, into a first split capacitor C1 and a second split capacitor C2 that are connected in parallel, where C1=K×C, C2=(1−K)×C, and a value range of a split capacitor coefficient K is (0, 1].

3002. Collect a power grid voltage and make a THD analysis, to obtain current THD.

Specifically, when the N inverters are off-grid, a power grid voltage of a grid-tied point of the inverter is collected and a THD analysis is made.

3003. Determine whether the current THD is less than or equal to THDm.

THDm is a specified THD threshold that meets normal starting-up of the inverter. If the current THD is greater than THDm, operation 3004 is performed. If the current THD is less than THDm, operation 3005 is performed.

3004. Turn on S2 to connect C1 of one inverter to the power grid.

After C1 of the first inverter is connected to a power grid system, operation 3002 is performed again to make a THD analysis to obtain current THD, and then operation 3003 is performed again. If the current THD is greater than THDm, operation 3004 is performed again. If the current THD is less than THDm, operation 3005 is performed.

3005. The inverter is started normally to implement grid-tied operation.

The current THD is less than THDm. This implements harmonic suppression on the power grid voltage when the inverter is in an off-grid shutdown state.

It should be understood that the method shown in FIG. 18 finally needs to implement normal starting-up of the inverter, to implement normal operation of the grid-tied power generating system, and to suppress harmonic distortion of the power grid in a starting-up process or before starting-up. The method shown in FIG. 19 is merely intended to implement harmonic distortion suppression on the power grid when the inverter is in an off-grid shutdown state.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inverter, comprising:
   an inverter circuit;
   an alternating current (AC) filter having an input port connected to an output port of the inverter circuit;
   an AC electromagnetic interference (EMI) filter; and
   a first AC switch connected between an output port of the AC filter and an input port of the AC EMI filter; wherein
   the inverter further comprises a first split capacitor disposed between the first AC switch and the input port of the AC EMI filter; and
   when the first AC switch is turned on, the first split capacitor operates as a filter capacitor of the ACEMI filter; or
   when the first A C switch is turned off, the first split capacitor is disconnected from the output port of the AC filter, and the first split capacitor is connected to a circuit loop in which an AC system connected to the output port of the AC EMI filter is located, to suppress harmonic distortion input into the AC system.

2. The inverter according to claim 1, wherein the output port of the AC filter is connected to the input port of the AC EMI filter via the first AC switch, the first split capacitor is connected in parallel to the input port of the AC EMI filter, and the first split capacitor is connected in parallel to the output port of the AC filter via the first AC switch.

3. The inverter according to claim 1, wherein the AC filter comprises an inductor L connected in series between the input port and the output port of the AC filter and comprises a second split capacitor, and the second split capacitor is connected in parallel with the output port of the AC filter.

4. The inverter according to claim 3, wherein when the first AC switch is turned off, the second split capacitor operates as a filter capacitor of the AC filter; or
   when the first AC switch is turned on, the first split capacitor and the second split capacitor are connected in parallel and then connected in series to the inductor L, to jointly form the filter capacitor of the AC filter; wherein
   the filter capacitor of the AC filter is configured to filter an alternating current obtained through inversion by the inverter circuit.

5. The inverter according to claim 3, further comprising:
   a second AC switch disposed between the first AC switch and the input port of the AC EMI filter, wherein the first split capacitor is disposed between the first AC switch and the second AC switch.

6. The inverter according to claim 5, wherein when the first AC switch is turned off and the second AC switch is turned on, the first split capacitor is disconnected from the output port of the AC filter, and the first split capacitor is connected to a circuit in which the AC system connected to the output port of the inverter is located, so that a capacitance value of the circuit in which the AC system is located is increased to suppress harmonic distortion input into the AC system.

7. The inverter according to claim 5, wherein when the first AC switch is turned on and the second AC switch is turned off, the first split capacitor and the second split capacitor are connected in parallel and then connected in series to the inductor L of the filter, to jointly form the filter capacitor of the AC filter.

8. The inverter according to claim 4, wherein the output port of the AC filter is connected to the input port of the AC EMI filter via the first AC switch and the second AC switch, the first split capacitor is connected in parallel to the output port of the AC filter via the first AC switch, and the first split capacitor is connected in parallel to the input port of the AC EMI filter by using the second AC switch.

9. A photovoltaic power generating system, comprising a photovoltaic module and the inverter according to claim 1, wherein
an output port of the photovoltaic module is connected to an input port of the inverter, an output port of the inverter is connected to an input port of an alternating current (AC) system,
the photovoltaic module is configured to generate a direct current (DC), and the inverter is configured to perform inversion processing on the direct current and input an alternating current obtained through inversion processing into the AC system.

10. A grid-tied power generating system, comprising N inverters according to claim 4 and N direct current (DC) systems, wherein
output ports of the N DC systems are connected to input ports of the N inverters in a one-to-one manner, and N is an integer greater than or equal to 1, and output ports of the N inverters are connected to an input port of an alternating current (AC) system.

11. A method for suppressing harmonic distortion of an alternating current (AC) system, wherein the method is applied to the grid-tied power generating system according to claim 10, wherein
when both a first AC switch and a second AC switch in any of the N inverters are turned off, the method comprises:
obtaining current total harmonic distortion (THD) of a voltage of the AC system; and
when a current THD is greater than a preset threshold, controlling a second AC switch of at least one of the N inverters to be turned on, to enable the current THD to be less than the preset threshold.

12. The method according to claim 11, wherein the controlling a second AC switch of at least one of the N inverters to be turned on comprises:
after a second AC switch of one of the N inverters is turned on, repeatedly performing obtaining the current THD and controlling the second AC switch until the current THD is less than or equal to the preset threshold.

13. The method according to claim 12, further comprising:
when the current THD is less than or equal to the preset threshold, determining whether an output voltage of the inverter meets a grid-tied power generating condition; and
when the output voltage of the inverter meets the grid-tied power generating condition, turning on a first AC switch and a second AC switch that are remaining AC switches not turned on in the N inverters.

* * * * *